United States Patent
Hubmann et al.

(10) Patent No.: US 12,024,123 B2
(45) Date of Patent: Jul. 2, 2024

(54) APPARATUSES AND METHODS FOR VEHICLE LOCKING SYSTEMS

(71) Applicant: Dr. Ing. h.c. F. Porsche Aktiengesellschaft, Stuttgart (DE)

(72) Inventors: Clemens Hubmann, Stuttgart (DE); Daniel Leingruber, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 17/510,686

(22) Filed: Oct. 26, 2021

(65) Prior Publication Data

US 2022/0153230 A1     May 19, 2022

(30) Foreign Application Priority Data

Nov. 18, 2020   (DE) ................. 10 2020 130 390.4

(51) Int. Cl.
  *B60R 25/24*   (2013.01)
  *B60R 25/30*   (2013.01)
  *G06F 16/25*   (2019.01)

(52) U.S. Cl.
  CPC .......... *B60R 25/241* (2013.01); *B60R 25/305* (2013.01); *G06F 16/252* (2019.01)

(58) Field of Classification Search
  CPC .... B60R 25/241; B60R 25/305; G06F 16/252
  See application file for complete search history.

(56) References Cited

U.S. PATENT DOCUMENTS

| | | | |
|---|---|---|---|
| 6,710,700 B1 | 3/2004 | Tatsukawa et al. | |
| 9,994,232 B2 | 6/2018 | Gould et al. | |
| 10,460,282 B2 * | 10/2019 | Stark ................. | G06K 19/0723 |
| 10,614,644 B2 | 4/2020 | Endo et al. | |
| 10,696,273 B2 | 6/2020 | Wilding | |

(Continued)

FOREIGN PATENT DOCUMENTS

| | | |
|---|---|---|
| CN | 108460865 A | 8/2018 |
| CN | 108698561 A | 10/2018 |

(Continued)

OTHER PUBLICATIONS

Chinese Office Action with English Search Report for Chinese Application No. 202111367707.2, dated Jul. 26, 2023, 23 pages.

(Continued)

*Primary Examiner* — Thomas D Alunkal
(74) *Attorney, Agent, or Firm* — Buchanan Ingersoll & Rooney PC

(57) ABSTRACT

In a method for activating a vehicle locking system, an optically detectable machine-readable code is detected. At least one message that identifies the vehicle locking system and that includes or represents the code is transmitted. At least one message that identifies the vehicle locking system and that includes or represents the code is received. A digital key for the vehicle locking system is determined, in particular from a database that is assigned to the vehicle locking system by the at least one message. The digital key is transmitted to a transfer device that is identified by the code and that is arranged in a housing of the apparatus for activating the vehicle locking system. The digital key is stored in the memory, and the digital key is transmitted in response to a request by the vehicle locking system.

19 Claims, 3 Drawing Sheets

(56) References Cited

U.S. PATENT DOCUMENTS

| | | | |
|---|---|---|---|
| 10,906,508 B2 | 2/2021 | Neuhoff et al. | |
| 2003/0020601 A1* | 1/2003 | Caren | G07C 9/00817 |
| | | | 340/425.5 |
| 2009/0243821 A1* | 10/2009 | Tieman | B60R 25/252 |
| | | | 340/426.36 |
| 2013/0146659 A1* | 6/2013 | Zhou | G06Q 20/321 |
| | | | 235/380 |
| 2013/0179005 A1 | 7/2013 | Nishimoto et al. | |
| 2013/0257590 A1* | 10/2013 | Kuenzi | G05B 1/01 |
| | | | 340/5.65 |
| 2015/0304477 A1* | 10/2015 | Carlén | B60R 25/04 |
| | | | 455/420 |
| 2017/0349146 A1 | 12/2017 | Krishnan | |
| 2018/0326947 A1* | 11/2018 | Oesterling | B60R 25/241 |
| 2019/0005754 A1* | 1/2019 | Frangenheim | H04W 4/70 |
| 2019/0122470 A1 | 4/2019 | Endo et al. | |
| 2020/0386568 A1* | 12/2020 | Dagley | G01C 21/3638 |

FOREIGN PATENT DOCUMENTS

| | | |
|---|---|---|
| CN | 111071203 A | 4/2020 |
| CN | 111918243 A | 11/2020 |
| DE | 102014019123 A1 | 6/2016 |
| DE | 102016215021 A1 | 2/2018 |
| JP | 2003120095 A | 4/2003 |
| JP | 2005139700 A | 6/2005 |
| JP | 2019079272 A | 5/2019 |
| JP | 2019131089 A | 8/2019 |
| KR | 20150092664 A | 8/2015 |
| KR | 20190032581 A | 3/2019 |

OTHER PUBLICATIONS

Korean Notice of Preliminary Rejection for Korean Application No. 10-2021-0156291, dated Sep. 20, 2023 with translation, 17 pages.
Chinese Office Action for Chinese Application No. 202111367707. 2, dated Feb. 8, 2024 with English translation, 45 pages.

* cited by examiner

APPARATUSES AND METHODS FOR VEHICLE LOCKING SYSTEMS

CROSS-REFERENCE TO RELATED APPLICATION

This application claims priority to German Patent Application No. 10 2020 130 390.4, filed Nov. 18, 2020, the content of such application being incorporated by reference herein in its entirety.

FIELD OF THE INVENTION

The invention relates to apparatuses and methods for vehicle locking systems.

BACKGROUND OF THE INVENTION

The use of digital mobile keys differs from the use of physical keys.

Both have the aim of gaining access to the vehicle. In a vehicle service, a customer hands over their physical vehicle key for acceptance by the garage staff for the duration of the vehicle service. Depending on the scope of work, the vehicle is moved, unlocked and started by several people. For example, the physical key plays a central role in processes such as moving through a car wash, onto a lifting platform, on company premises or for road tests.

If a customer arrives at the vehicle service only via a digital mobile key, i.e., unlocked and started, e.g., via smartphone, or has a breakdown, it has to be possible to transfer the access authorization.

In principle, this can be done using an existing smart card. However, if this is not available in the vehicle, a complex digital key handling process to hand over access authorization is created for the customer.

SUMMARY OF THE INVENTION

The key handling process is improved by the methods and apparatuses described herein.

In an apparatus for activating the vehicle locking system, the apparatus comprises a housing, an optically detectable machine-readable code being arranged on an outside of the housing, a transfer device and a memory being arranged in the housing, the transfer device being designed to receive a digital key and to store said key in the memory, the transfer device being designed to transmit the digital key in response to a request by the vehicle locking system. The apparatus for activating the vehicle locking system is, for example, a vehicle key on which the digital key that authorizes the activation of the vehicle locking system can be stored. The digital key is preferably transferrable to the key apparatus via a QR code that is attached to the key apparatus and is assigned, in particular uniquely, to the key apparatus.

The apparatus can comprise an input device and a deletion device, the input device being designed to recognize user input, the deletion device being designed to delete the digital key from the memory in response to the user input.

The transfer device can be designed (i.e., configured) to transmit, in response to the user input or to the deletion of the digital key, confirmation that the digital key has been deleted from the memory.

An apparatus for programming the apparatus for activating the vehicle locking system comprises a receiver which is designed to receive, from a terminal, at least one message that identifies the vehicle locking system and that comprises or represents the optically detectable machine-readable code arranged on the outside of the housing of the apparatus for activating the vehicle locking system, the programming apparatus comprising a computing device which is designed to determine the digital key for the vehicle locking system, in particular from the database that is assigned to the vehicle locking system by the at least one message, and the programming apparatus comprising a transmitter which is designed to transmit the digital key to the transfer device that is identified by the code and that is arranged in the housing of the apparatus for activating the vehicle locking system.

The receiver can be designed to receive, from the transfer device, the confirmation that the digital key has been deleted from the memory.

The transmitter can be designed to transmit, to the terminal, the confirmation that the digital key has been deleted from the memory.

A terminal for activating the vehicle locking system comprises a detection device, in particular a camera, which is designed to detect the optically detectable machine-readable code arranged on the outside of the housing of the apparatus for activating the vehicle locking system, and a transmitter which is designed to transmit the at least one message that identifies the vehicle locking system and that comprises or represents the code.

The terminal can have a receiver and an in particular graphical interface, the receiver being designed to receive the confirmation that the digital key has been deleted from the memory of the apparatus for activating the vehicle locking system, and the interface being designed to display the confirmation or the representation of the confirmation.

In a method for activating the vehicle locking system, the apparatus for activating the vehicle locking system is provided, which apparatus comprises the housing, the optically detectable machine-readable code being arranged on the outside of the housing, the transfer device and the memory being arranged in the housing, the digital key being received by the transfer device, the digital key being stored in the memory, and the digital key being transmitted in response to the request by the vehicle locking system.

The user input is preferably recognized, and the digital key is preferably deleted from the memory in response to the user input.

The confirmation that the digital key has been deleted from the memory is preferably transmitted in response to the user input or to the deletion of the digital key.

In a method for programming the apparatus for activating the vehicle locking system, from a terminal, at least one message is received that identifies the vehicle locking system and that comprises or represents an optically detectable machine-readable code arranged on an outside of the housing of the apparatus for activating the vehicle locking system, the digital key for the vehicle locking system is determined in particular from the database that is assigned to the vehicle locking system by the at least one message, and the digital key is transmitted to the transfer device that is identified by the code and that is arranged in the housing of the apparatus for activating the vehicle locking system.

The confirmation that the digital key has been deleted from the memory is preferably received.

The confirmation that the digital key has been deleted from the memory is preferably transmitted from the transfer device to the terminal.

In a method for activating the vehicle locking system, the optically detectable machine-readable code arranged on an outside of a housing of an apparatus for activating the vehicle locking system is detected, and the at least one message that identifies the vehicle locking system and that comprises or represents the code is transmitted. The method is implemented, for example, on the terminal as part of an application in a mobile phone, which application also manages a digital mobile key.

The confirmation that the digital key has been deleted from a memory of the apparatus for activating a vehicle locking system is preferably received, and the confirmation or the representation of the confirmation is preferably displayed.

BRIEF DESCRIPTION OF THE DRAWINGS

Further advantageous embodiments can be found in the description and the drawings. In the drawings.

DETAILED DESCRIPTION OF THE INVENTION

Figure 1:
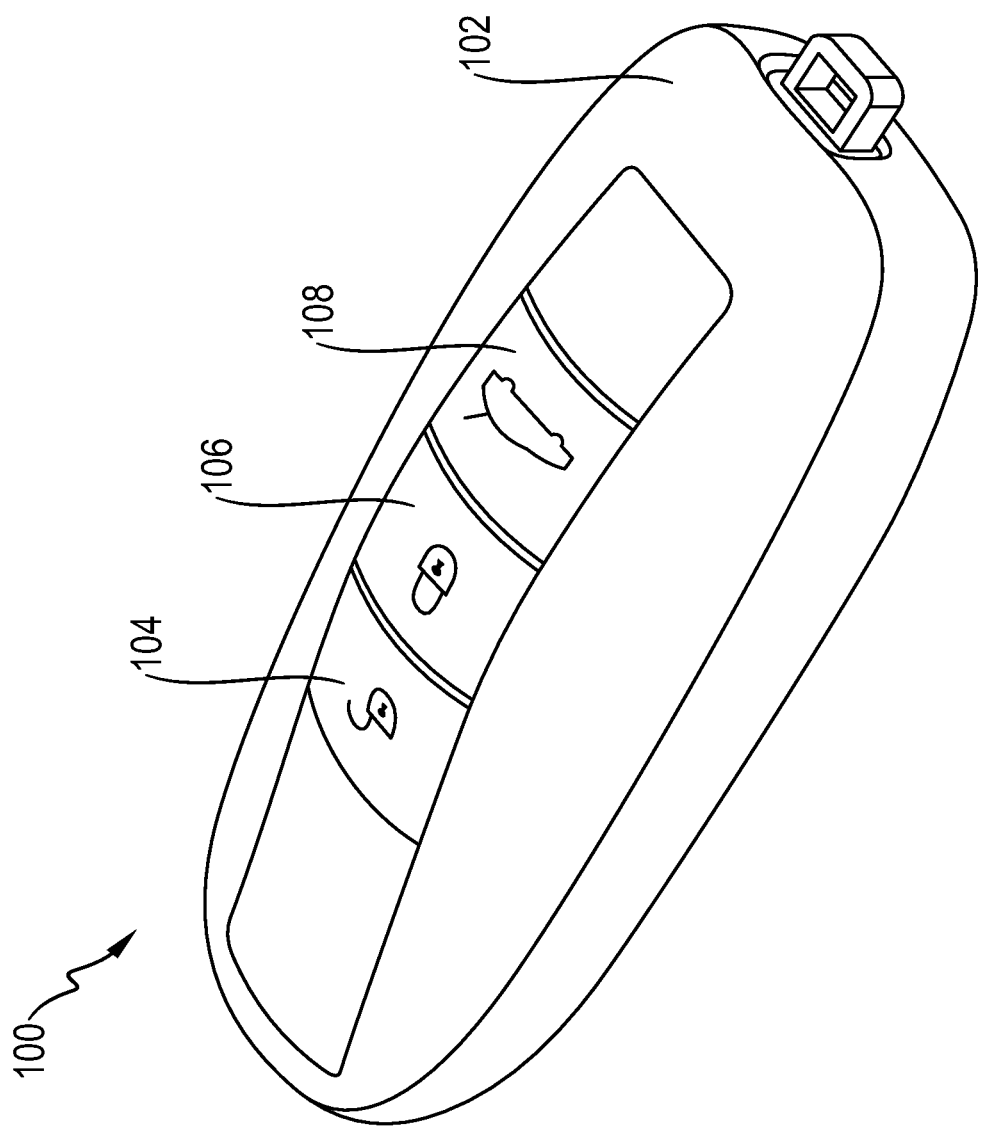
FIG. 1 is a schematic first view of an apparatus for activating a vehicle locking system.
Figure 2:
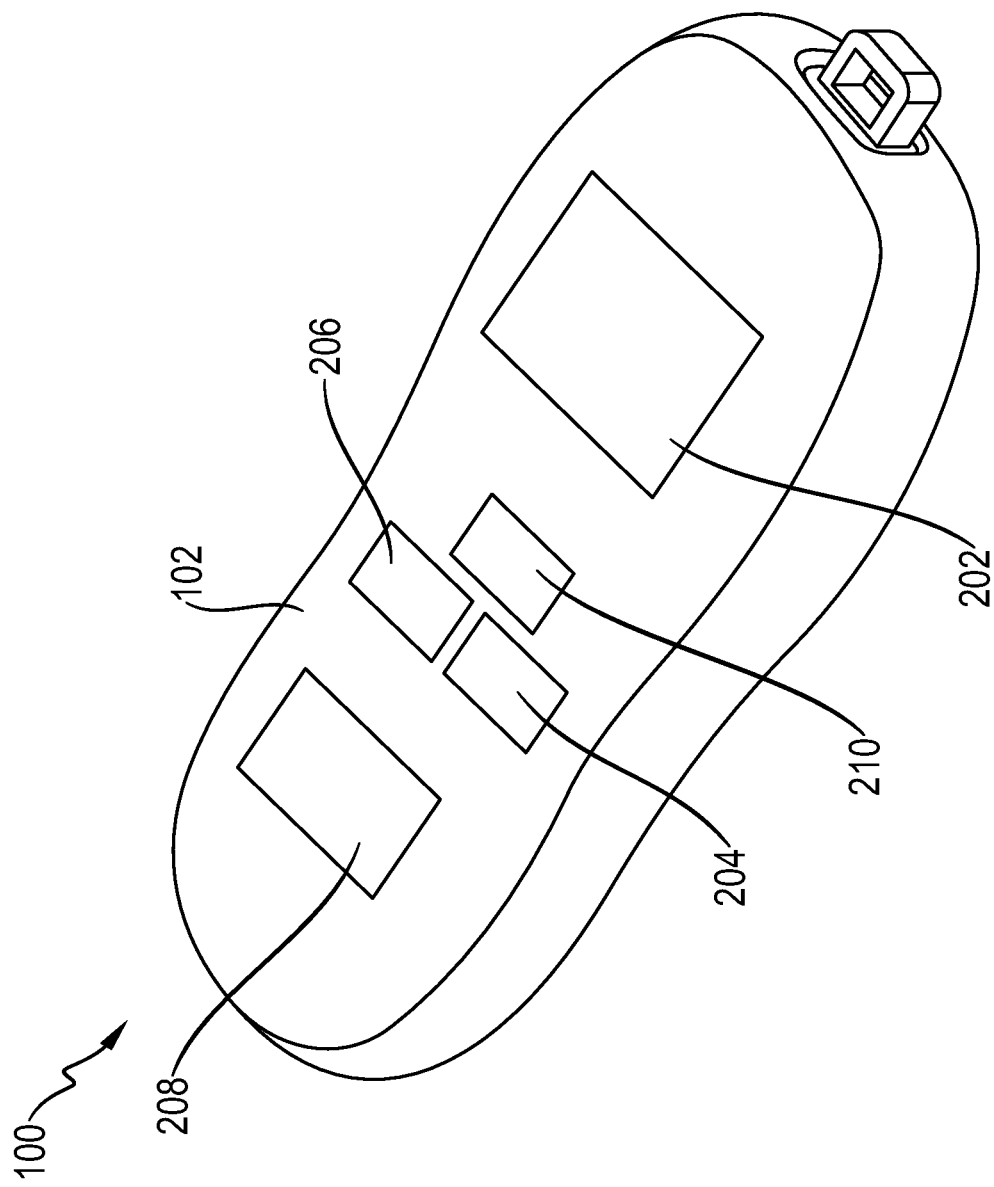
FIG. 2 is a schematic second view of the apparatus for activating a vehicle locking system.

FIG. 1 schematically shows a first view, in particular a perspective view, of a front side of an apparatus 100 for activating a vehicle locking system. FIG. 2 is a schematic second view, in particular a perspective view, of a rear side of the apparatus 100 for activating the vehicle locking system. The apparatus 100 for activating the vehicle locking system is a physical key which advantageously corresponds in terms of its shape and dimensions to a conventional key for vehicles.

The apparatus 100 for activating the vehicle locking system is a vehicle key in the example. The apparatus 100 comprises a housing 102.

An optically detectable machine-readable code 202 is arranged on an outside of the housing 102.

A transfer device 204 and a memory 206 are arranged in the housing 102.

The transfer device 204 is designed to receive a digital key, in particular in a radio signal, and to store said key in the memory 206.

The transfer device 204 is designed to transmit, in particular in a radio signal, the digital key in response to a request by the vehicle locking system.

In the example, the code is a QR code.

The digital key authorizes the activation of the vehicle locking system.

The apparatus 100 can also comprise an input device 208 and a deletion device 210.

The input device 208 is designed to recognize user input. The input device 208 can be a push-button or a switch. For example, the push-button is arranged on the vehicle key. The push-button can be highlighted by a symbol or in color, for example in red. The deletion device 210 is designed to delete the digital key from the memory 206 in response to the user input.

The transfer device 204 can be designed to transmit, in particular in a radio signal, and in response to the user input or to the deletion of the digital key, confirmation that the digital key has been deleted from the memory 206.

In the example, the apparatus 100 comprises a battery (not shown in the drawings) for supplying power.

Figure 3:
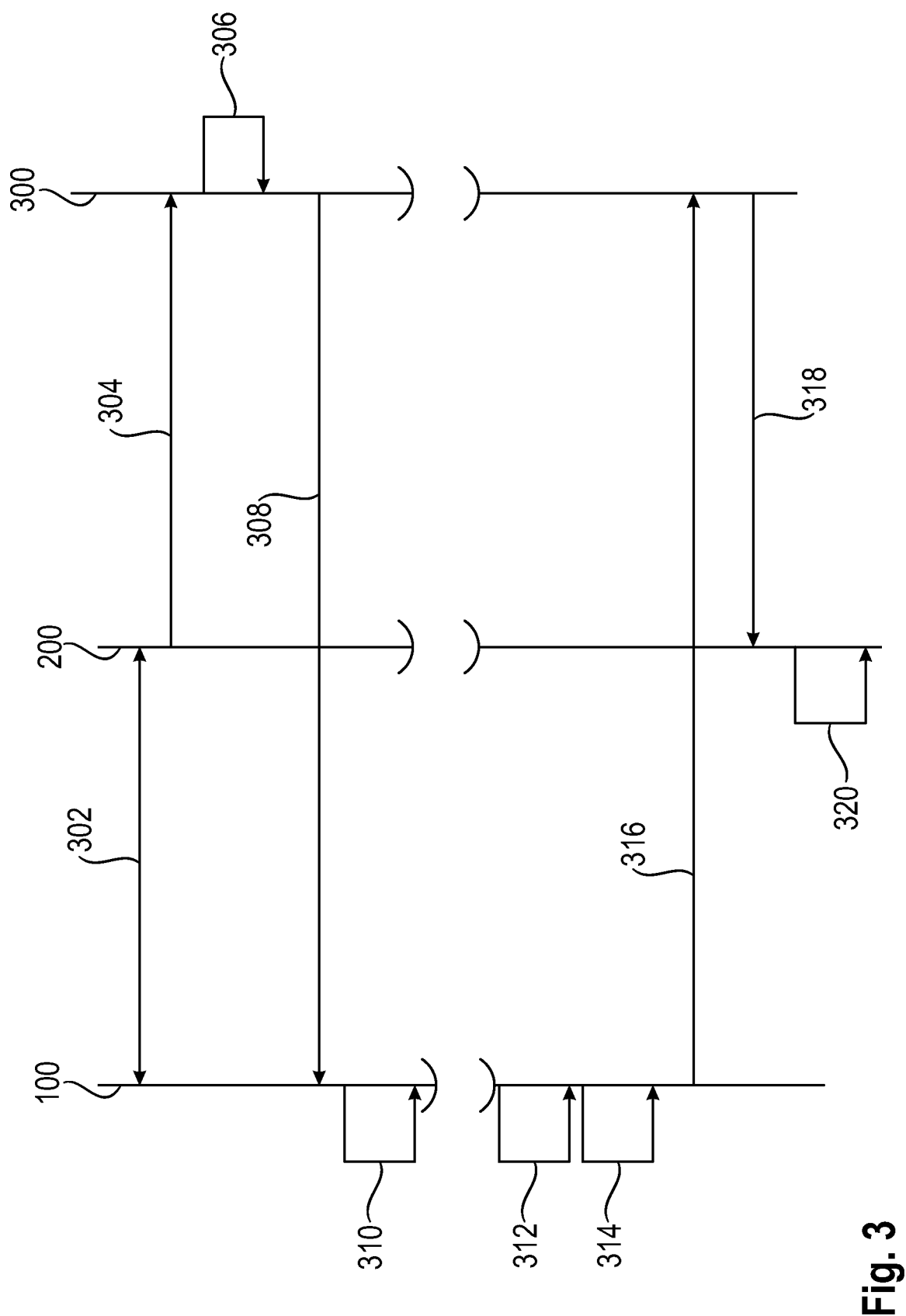
FIG. 3 shows steps in a method.

A method is described below with reference to FIG. 3. Parts of the method are executed on the apparatus 100 for activating the vehicle locking system. Parts of the method are executed on an apparatus 300 for programming the apparatus 100 for activating the vehicle locking system. The programming apparatus 300 can comprise or can be connected to an OEM backend. The apparatus 300 is referred to below as a programming device. Parts of the method are executed on a terminal 200 for activating the vehicle locking system. The terminal 200 is, for example, a mobile phone.

The programming device 300 comprises a receiver, a computing device and a transmitter. The receiver and the transmitter are designed to communicate with the transfer device 204 in particular by means of radio signals. The receiver and the transmitter are designed to communicate with the terminal 200, in particular using TCP/IP protocol.

The receiver is designed to receive, from the terminal 200, at least one message that identifies the vehicle locking system and that comprises or represents the optically detectable machine-readable code 202 arranged on the outside of a housing 102 of the apparatus for activating the vehicle locking system.

The receiver can be designed to receive, from the transfer device 204, confirmation that the digital key has been deleted from the memory 206.

The computing device is designed to determine a digital key for the vehicle locking system, in particular from a database. The database can be part of the programming device or an OEM backend.

A digital key is assigned to the vehicle locking system by the at least one message.

The transmitter is designed to transmit the digital key to the transfer device 204 that is identified by the code 202 and that is arranged in the housing 102 of the vehicle key.

The transmitter can be designed to transmit, to the terminal 200, confirmation that the digital key has been deleted from the memory 206.

The terminal 200 comprises an in particular optical detection device, in particular a camera.

The detection device is designed to detect the optically detectable machine-readable code 202 arranged on the outside of the housing 102.

The terminal 200 comprises a transmitter which is designed to transmit the message that identifies the vehicle locking system and that comprises or represents the code 202. In the example, the transmitter is designed to communicate using the TCP/IP protocol, for example via mobile radio signals.

The vehicle locking system is identified, for example, by a mobile key stored in the terminal 200. For example, the mobile key is transmitted in the message with the code 202 or an in particular alphanumeric representation of the code 202.

The terminal 200 can have a receiver and an in particular graphical interface. In the example, the receiver is designed to communicate using the TCP/IP protocol, for example via mobile radio signals.

The receiver is designed to receive confirmation that the digital key has been deleted from a memory 206 of the vehicle key. The interface can be designed to display the confirmation or a representation of the confirmation.

For a specific application in a garage, a process may look as follows:

1) A customer arrives at the garage and wants to hand over their vehicle, but is traveling in the vehicle without a physical key and without an available smart card.

2) A service advisor asks the customer to scan the QR code of the described new type of vehicle key using their mobile phone and thus transfer a digital vehicle key thereto.

For the customer, this allows the vehicle handover to be as simple and uncomplicated as possible without further digital key release tasks until the vehicle is picked up.

Using the vehicle key, the garage processes can be kept unchanged, with consistent quality.

5) When the customer picks up the vehicle, the digital key can advantageously be removed again using the push-button on the vehicle key. The customer is optionally informed about this automatically, for example by pop-up on their terminal 200, for example their mobile phone.

The corresponding method begins, for example, when the application by means of which the code 202 is to be scanned is started on the terminal 200. At the beginning, the apparatus 100 for activating the vehicle locking system, i.e., the vehicle key 100, is provided with the code 202.

In a step 302, the code 202 is detected in particular by the camera.

In a step 304, the message that identifies the vehicle locking system and that comprises or represents the code 202 is transmitted from the terminal 200 to the programming device 300.

In a step 306, the digital key for the vehicle locking system is determined in particular from the database.

In a step 308, the digital key is transmitted from the transfer device 204 to the vehicle key 100.

In a step 310, the digital key is stored in the memory 206.

The digital key can then be transmitted in response to a request by the vehicle locking system. This process can be repeated as often as required, e.g., during a vehicle service.

In a step 312, user input is recognized.

In a step 314, the digital key is deleted from the memory 206 in response to the user input.

The digital key can then no longer be transmitted in response to a request by the vehicle locking system.

Optionally, in response to the user input or to the deletion of the digital key, confirmation that the digital key has been deleted from the memory 206 is transmitted in a step 316. In the example, the confirmation is received by the programming device 300.

In an optional step 318, the confirmation is transmitted from the transfer device 204 to the terminal 100.

Direct communication between the vehicle key 100 and the terminal 200 is not provided in the example. If coordinated transmitters and receivers are provided in the terminal 200 and in the vehicle key 100, direct communication of the confirmation is also possible.

In an optional step 320, the confirmation that the digital key has been deleted from the memory 206 of the vehicle key, or a representation of the confirmation, is displayed via the graphical interface.

Wired communication can also be provided between the vehicle key 100 and the programming device 300 or the terminal 200. In this case, both the vehicle key 100 and the programming device 300 comprise a corresponding interface and are at least temporarily connected to a data cable for communication.

What is claimed is:

1. A physical key for activating a vehicle locking system, wherein the physical key comprises:
    a housing,
    an optically detectable machine-readable code being arranged on an outside of the housing,
    a transfer device and a memory being arranged in the housing, wherein the transfer device is configured to receive a digital key in response to scanning of the optically detectable machine-readable code and store said key in the memory, the transfer device being further configured to transmit the digital key in response to a request by the vehicle locking system, and
    a push button arranged on the physical key, said push button being configured to delete the digital key from the memory in response to user input via a push button on the physical key.

2. The physical key according to claim 1, wherein the on the physical key further comprises an input device configured to recognize the user input.

3. The physical key according to claim 2, wherein, in response to the user input or to deletion of the digital key, the transfer device is configured to transmit confirmation that the digital key has been deleted from the memory.

4. A programming apparatus for programming the physical key of claim 1 for activating the vehicle locking system, wherein the programming apparatus comprises:
    a receiver which is configured to receive, from a terminal, at least one message that identifies the vehicle locking system and that comprises or represents the optically detectable machine-readable code arranged on the outside of the housing of the physical key for activating the vehicle locking system,
    a computing device which is configured to determine the digital key for the vehicle locking system from a database that is assigned to the vehicle locking system by the at least one message, and
    a transmitter which is configured to transmit the digital key to the transfer device that is identified by the machine-readable code and that is arranged in the housing of the physical key for activating the vehicle locking system.

5. The programming apparatus according to claim 4, wherein the receiver is configured to receive, from the transfer device, confirmation that the digital key has been deleted from the memory.

6. The programming apparatus according to claim 5, wherein the transmitter is configured to transmit, to the terminal, the confirmation that the digital key has been deleted from the memory.

7. A combination comprising the physical key according to claim 1 and a terminal, wherein the terminal comprises:
    a detection device in the form of a camera, which is configured to detect the optically detectable machine-readable code arranged on the outside of the housing of the physical key for activating the vehicle locking system, and
    a transmitter which is configured to transmit at least one message that identifies the vehicle locking system and that comprises or represents the machine-readable code.

8. The combination according to claim 7, wherein the terminal has a receiver and a graphical interface, the receiver being configured to receive confirmation that the digital key has been deleted from the memory of the physical key for activating the vehicle locking system, and the graphical interface being configured to display the confirmation or a representation of the confirmation.

9. A method for activating a vehicle locking system including a physical key having a housing, an optically detectable machine-readable code arranged on an outside of the housing, a transfer device and a memory arranged in the housing, the method comprising:
    receiving a digital key by the transfer device in response to scanning of the optically detectable machine-readable code, storing the digital key in the memory, transmitting the digital key in response to a request by the vehicle locking system, and deleting the digital key from the memory in response to user input via a push button arranged on the physical key.

10. The method according to claim 9, further comprising recognizing the user input.

11. The method according to claim 10, wherein, in response to the user input or to the deletion of the digital key, said method further comprises transmitting confirmation that the digital key has been deleted from the memory.

12. A method for programming the physical key of claim 1, said method comprising:

receiving, from a terminal, at least one message that identifies the vehicle locking system and that comprises or represents the optically detectable machine-readable code on the outside of the housing of the physical key for activating the vehicle locking system, determining the digital key for the vehicle locking system from a database that is assigned to the vehicle locking system by the at least one message, and transmitting the digital key to the transfer device that is identified by the code and that is arranged in the housing of the physical key for activating the vehicle locking system.

13. The method according to claim 12, further comprising receiving confirmation that the digital key has been deleted from the memory.

14. The method according to claim 13, further comprising transmitting to the terminal the confirmation that the digital key has been deleted from the memory from the transfer device.

15. A method for activating a vehicle locking system using the physical key of claim 1, said method comprising:

detecting the optically detectable machine-readable code arranged on the outside of the housing of the physical key for activating the vehicle locking system, and transmitting at least one message that identifies the vehicle locking system and that comprises or represents the code.

16. The method according to claim 15, further comprising receiving confirmation that the digital key has been deleted from the memory of the physical key for activating the vehicle locking system, and displaying the confirmation or a representation of the confirmation.

17. The method according to claim 12, wherein the database is part of a programming apparatus for programming the physical key.

18. The programming apparatus according to claim 4, wherein the receiver and the transmitter are configured to communicate with the transfer device by radio signals.

19. The programming apparatus according to claim 4, wherein the receiver and the transmitter are configured to communicate with the terminal using Transmission Control Protocol/Internet Protocol ("TCP/IP").

* * * * *